(12) United States Patent
Liu et al.

(10) Patent No.: US 12,086,706 B2
(45) Date of Patent: Sep. 10, 2024

(54) PROCESSING SEQUENTIAL INPUTS USING NEURAL NETWORK ACCELERATORS

(71) Applicant: Google LLC, Mountain View, CA (US)

(72) Inventors: Jack Liu, Saratoga, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/971,589

(22) PCT Filed: Dec. 19, 2019

(86) PCT No.: PCT/US2019/067389
§ 371 (c)(1),
(2) Date: Aug. 20, 2020

(87) PCT Pub. No.: WO2021/126203
PCT Pub. Date: Jun. 24, 2021

(65) Prior Publication Data
US 2023/0119126 A1    Apr. 20, 2023

(51) Int. Cl.
*G06N 3/06*    (2006.01)
*G06F 12/02*   (2006.01)
*G06N 3/063*   (2023.01)

(52) U.S. Cl.
CPC ......... *G06N 3/063* (2013.01); *G06F 12/0223* (2013.01)

(58) Field of Classification Search
CPC ............................ G06N 3/063; G06F 12/0223
See application file for complete search history.

(56) References Cited

U.S. PATENT DOCUMENTS

| 9,710,265 B1 | 7/2017 | Temam et al. |
| 2018/0121196 A1* | 5/2018 | Temam ............... G06F 9/30065 |

(Continued)

FOREIGN PATENT DOCUMENTS

| JP | H11144478 | * 11/1997 |
| TW | 201923559 | 6/2019 |

(Continued)

OTHER PUBLICATIONS

TW Office Action in Taiwan Application No. 109129830, dated Aug. 25, 2021, 7 pages (with English translation).
International Preliminary Report on Patentability in International Appln. No. PCT/US2019/067389, dated Jun. 30, 2022, 8 pages.

(Continued)

*Primary Examiner* — Omar F Fernandez Rivas
*Assistant Examiner* — Tri T Nguyen
(74) *Attorney, Agent, or Firm* — Fish & Richardson P.C.

(57) ABSTRACT

A hardware accelerator can store, in multiple memory storage areas in one or more memories on the accelerator, input data for each processing time step of multiple processing time steps for processing sequential inputs to a machine learning model. For each processing time step, the following is performed. The accelerator can access a current value of a counter stored in a register within the accelerator to identify the processing time step. The accelerator can determine, based on the current value of the counter, one or more memory storage areas that store the input data for the processing time step. The accelerator can facilitate access of the input data for the processing time step from the one or more memory storage areas to at least one processor coupled to the one or more memory storage areas. The accelerator can increment the current value of the counter stored in the register.

20 Claims, 6 Drawing Sheets

(56) References Cited

U.S. PATENT DOCUMENTS

| | | | |
|---|---|---|---|
| 2018/0121796 A1* | 5/2018 | Deisher | G10L 15/16 |
| 2018/0267898 A1 | 9/2018 | Henry et al. | |
| 2018/0285254 A1 | 10/2018 | Baum et al. | |
| 2018/0341495 A1 | 11/2018 | Culurciello et al. | |
| 2019/0042241 A1 | 7/2019 | Akin | |
| 2019/0205737 A1* | 7/2019 | Bleiweiss | G06N 3/044 |
| 2019/0370631 A1* | 12/2019 | Fais | G06N 3/045 |
| 2019/0378001 A1* | 12/2019 | Litvak | G06N 3/047 |

FOREIGN PATENT DOCUMENTS

| | | |
|---|---|---|
| TW | 201923586 | 6/2019 |
| TW | 201947466 | 12/2019 |
| WO | WO 2009/110143 | 9/2009 |

OTHER PUBLICATIONS

Ando et al., "BRein memory: A 13-layer 4.2 K neuron/0.8 M synapse binary/ternary reconfigurable in-memory deep neural network accelerator in 65 nm CMOS," 2017 Symposium on VLSI Circuits, Jun. 2017, 2 pages.

TW Office Action in Taiwan Application No. 109129830, dated Mar. 11, 2021, 7 pages (with English translation).

PCT International Search Report and Written Opinion in International Appln. No. PCT/US2019/067389, dated Oct. 10, 2020, 15 pages.

Wang et al., "Accelerating Recurrent Neural Networks: A Memory-Efficient Approach," IEEE Transactions on Very Large Scale Integration (VLSI) Systems, Oct. 2017, 25(10)2763-2775.

Office Action in Taiwan Application No. 111137884, dated Feb. 29, 2024, 7 pages (with English translation).

* cited by examiner

| OPERATION CODE 304 | OPERATION TYPE 306 | OPERATION DESCRIPTION 308 |
|---|---|---|
| 1 | Tensor Operation | Particular computing unit to perform computations at convolution layers |
| 2 | Tensor Operation | Particular computing unit to perform computations at pooling layers |
| 3 | Tensor Operation | Particular computing unit to perform computations at indexed slice layer |
| 4 | Direct Memory Access Operation | Particular computing unit to send input data for a particular iteration, within the input data for all iterations, to a particular memory location of a memory of a specific computing unit |
| 5 | Direct Memory Access Operation | Particular computing unit to perform send output data for a particular iteration from a specific memory location of a memory of a particular computing unit to the memory storing output. |
| 6 | Direct Memory Access Operation | Particular computing unit to send data from one particular memory location of a memory to another particular memory location of that memory |
| 7 | Direct Memory Access Operation | Particular computing unit to send data from a specific memory location of a particular memory to a specific memory location of another particular memory |
| 8 | Fencing Operation | Controller to prevent any new instructions from being received by the CPU until pending instructions are completed or marked as completed. |

FIG. 3

DATA MEMORY 158 — 402

| Memory Storage Area, Computing Unit Number 402 | Ends of Memory Storage Area 404 |
|---|---|
| FIRST, 1 | 1, 50 |
| FIRST, 2 | 51, 100 |
| FIRST, 3 | 101, 150 |
| FIRST, 4 | 151, 200 |
| FIRST, 5 | 201, 250 |
| FIRST, 6 | 251, 300 |
| FIRST, 7 | 301, 350 |
| FIRST, 8 | 351, 400 |

PROCESSING SEQUENTIAL INPUTS USING NEURAL NETWORK ACCELERATORS

CROSS-REFERENCE TO RELATED APPLICATION

This application is a National Stage Application under 35 U.S.C. § 371 and claims the benefit of International Application No. PCT/US2019/067389, filed Dec. 19, 2019. The disclosure of the foregoing application is hereby incorporated by reference in its entirety.

TECHNICAL FIELD

The subject matter described herein generally relates to hardware accelerators, and more particularly to a hardware accelerator configured to quickly find data stored within memories of the hardware accelerator.

BACKGROUND

A hardware accelerator is computer hardware specially made to perform some operations more efficiently than possible in software running on a general-purpose central processing unit (CPU). Such hardware accelerator is typically associated with a host device (e.g., CPU) that performs some operations, while the hardware accelerator performs other operations. When the hardware accelerator needs to perform operations, it frequently communicates with the host device to, for example, receive instructions and either the input data or identification of specific memory storage areas where the input data is stored. Such frequent communications can disadvantageously cause computational latency.

SUMMARY

In one aspect, a hardware accelerator can store, in a plurality of memory storage areas in one or more memories on the hardware accelerator, input data for each processing time step of a plurality of processing time steps for processing sequential inputs to a machine learning model (e.g., recurrent neural network). For each processing time step of the plurality of processing time steps, the following can be performed. The hardware accelerator can access a current value of a counter stored in a register within the hardware accelerator. The current value of the counter can identify the processing time step. The hardware accelerator can determine, based on the current value of the processing time step counter, one or more memory storage areas that store the input data for the processing time step. The hardware accelerator can facilitate access of the input data for the processing time step from the one or more memory storage areas to at least one processor coupled to the one or more memory storage areas. The hardware accelerator can increment the current value of the counter stored in the register.

In some variations, one or more of the following can be further implemented either individually or in any feasible combination. The determining of the one or more memory storage areas that store the input data for the processing time step can include: retrieving, by the hardware accelerator, a value of a stride associated with the machine learning model (e.g., recurrent neural network); computing, by the hardware accelerator and based on the current value of the counter and the value of the stride, values of at least two edges of the input data for the processing time step; and determining, by the hardware accelerator and based on the values of the at least two edges, the one or more memory storage areas that store the input data for the processing time step. The hardware accelerator can generate a mapping of each memory storage area and ends of the one or more memory storage areas. The hardware accelerator can store the mapping in a register within the hardware accelerator. The ends of the one or more memory storage areas encompass the at least two edges. The computing of the values of the edges can involve multiplying, by the hardware accelerator, the current value of the counter and the value of the stride.

The hardware accelerator can receive, from a central processing unit, a single instruction for each processing time step of the plurality of processing time steps. The hardware accelerator can perform at least the determining of the one or more storage areas and the facilitating of the access of the input data for the processing time step to the at least one processor in response to the receiving of the single instruction. The hardware accelerator can store the single instruction in another memory within the hardware accelerator. The hardware accelerator and the central processing unit can be embedded in a mobile phone.

The hardware accelerator can receive, prior to the storing, the input data for each processing time step of the plurality of processing time steps from a central processing unit. The storing of the input data for each processing time step of the plurality of processing time steps can include transmitting, by a controller of the hardware accelerator, the input data for each processing time step of the plurality of processing time steps to the plurality of memory storage areas. The controller can transmit the input data for each processing time step of the plurality of processing time steps to the plurality of memory storage areas over at least one bus.

The at least one processor and the one or more memory storage areas are present within a single computing unit of a plurality of computing units. The input data can be separate and/or different for each processing time step of the plurality of processing time steps. The hardware accelerator can store the output generated by the machine learning model (e.g., recurrent neural network) for each processing time step of the plurality of processing time steps in another memory within the hardware accelerator. The hardware accelerator can transmit the output for each processing time step of the plurality of processing time steps collectively after the plurality of processing time steps.

In another aspect, a non-transitory computer program product is described that can store instructions that, when executed by at least one programmable processor, cause the at least one programmable processor to perform operations noted herein. In yet another aspect, a system can include at least one programmable processor, and a machine-readable medium storing instructions that, when executed by the at least one processor, cause the at least one programmable processor to perform the operations described herein. In some aspects, an article of manufacture can include computer executable instructions stored on non-transitory computer readable media, which, when executed by a computer, causes the computer to perform operations described herein.

The subject matter described herein provides many advantages. For example, the architecture described herein permits the accelerator to minimize the communication with the host device (e.g., CPU). Such minimization of communication can advantageously minimize computational latency. Further, the accelerator describes computations, such as tensor computations, to be distributed across multiple computing units. Configuring each computing unit to perform specific tensor computation can beneficially permit an accelerated traversal of tensors and computation of tensor operations with, for example, a reduced number of instructions. Such acceleration advantageously enhances computational efficiency. Further, the input to the machine learning model (e.g. neural network) includes a sequence of multiple inputs—where each input corresponds to a different processing time step—and the accelerator receives, from the host device, all of the inputs for all of the processing time steps at once with a single instruction that instructs the accelerator to perform specific operations on the entire input data (which includes all of the inputs referred above) for all processing steps. Having a single instruction for all the processing steps from the host device is advantageous over separate instructions (corresponding to potentially different slices of the entire input data) for each processing step. For example, computation bandwidth of the accelerator is increased by reducing the number of instructions that the accelerator is required to execute when traversing a tensor to perform one or more computations.

The details of one or more variations of the subject matter described herein are set forth in the accompanying drawings and the description below. Other features and advantages of the subject matter described herein will be apparent from the description, the drawings, and the claims.

BRIEF DESCRIPTION OF DRAWINGS

Like reference symbols in the various drawings indicate like elements.

DETAILED DESCRIPTION

Figure 1:
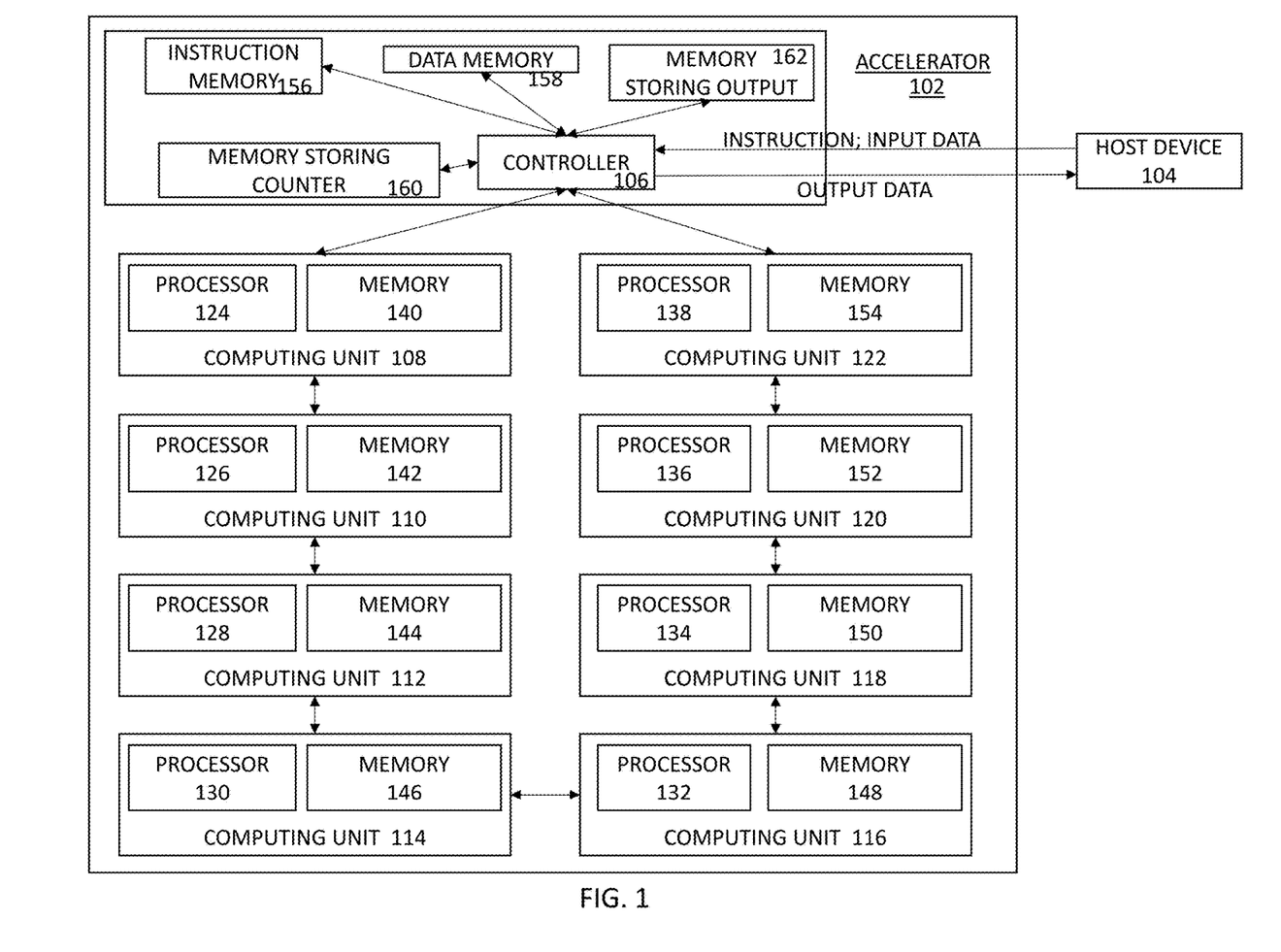
FIG. 1 illustrates an accelerator, which is configured to perform specific operations of a neural network, and a host device (e.g., central processing unit (CPU)).

FIG. 1 illustrates an accelerator 102, which is configured to perform specific operations of a neural network, and a host device (e.g., central processing unit (CPU)) 104. The neural network can be a recurrent neural network (RNN). Although the neural network is described as RNN through this document, in some implementations the neural network can be any neural network that can process a sequence of inputs over multiple time steps, e.g., a Transformer self-attention based neural network, a convolutional neural network, and so on. The RNN can be a long short-term memory (LSTM) network, a gated rectified unit (GRU), or any other recurrent neural network that maintains and updates an internal state while processing a sequence of inputs over multiple time steps. The accelerator 102 can also be referred to as a hardware accelerator. The accelerator 102 and the host device 104 can be embedded within a computing device, such as a mobile phone or a tablet computer. The accelerator 102 can have a controller 106 and multiple computing units such as 108, 110, 112, 114, 116, 118, 120 and 122. While eight computing units 108-122 are shown, in alternate implementations the accelerator 102 can have any other number of computing units, such as any number between two and sixteen. Each computing unit 108-122 can have at least one programmable processor 124-138 and at least one memory 140-154. The accelerator 102 can further have other memories, such as an instruction memory 156, a data memory 158, a memory 160 configured to store a counter, and a memory 162 configured to store an output. Each of the memories 140-154 can have several memory storage areas. Each memory storage area can be configured to store, among other things (e.g., weights for the RNN), input data as explained below by FIG. 2. One example of a computing unit (i.e., one of computing units 108-122) is explained in greater detail below by FIG. 2A.

To perform the specific operations of the RNN, the controller 106 receives, from the host device 104, input data for the RNN, and an instruction specifying operations to be performed by the accelerator 102. The input data can include weights of the RNN and the data on which the RNN is executed to generate inferences. The input to the RNN can include a sequence of multiple inputs, and each input can correspond to a different processing time step. In some disadvantageous implementations, the controller 106 can receive, one by one from the host device 104, slices of the entire input data for each processing time step (i.e., input corresponding to that processing time step) of the RNN. Here, however, the controller 106 receives, all at once from the host device 104, the entire input data (i.e., all the inputs for all of the processing steps) of the RNN—this minimizes the communication between the accelerator 102 and the host device 104, thereby advantageously minimizing latency and maximizing computational efficiency.

The instruction is a single instruction that instructs the accelerator 102 to perform the specific RNN operations on the input data for all processing time steps. Having a single instruction for the entire input data for all processing time steps from the host device 104 is preferable over multiple instructions corresponding to individual processing time steps, thereby minimizing the communication between the accelerator 102 and the host device 104, which in turn advantageously reduces/minimizes computational latency and thus maximizes computational efficiency. The specific RNN operations noted above can include tensor operations, data memory access operations, fencing operations, and/or other operations. One example of various operations is described below by FIG. 3.

Figure 2:
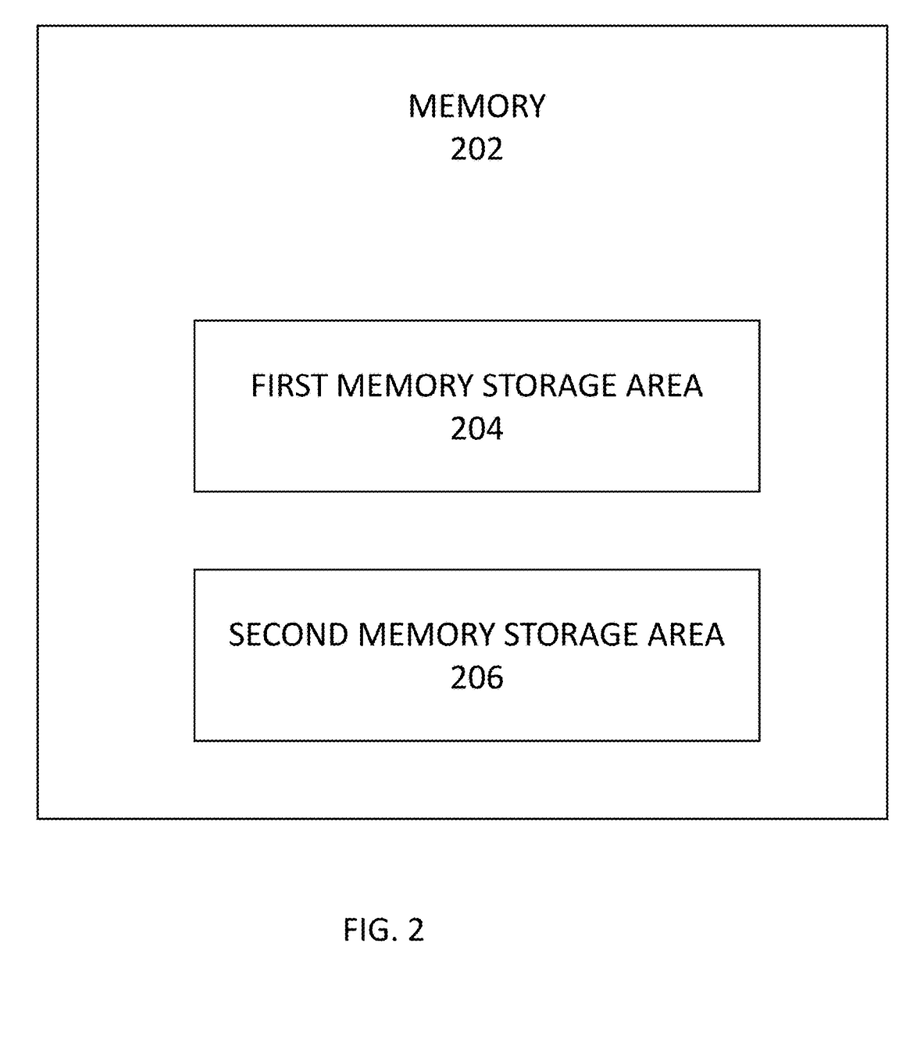
FIG. 2 illustrates a memory—which can be one of the memories on the accelerator—that includes a first memory storage area and a second memory storage area.

The controller 106 can transmit, in a serial fashion, the received input data for the entire processing time step to memories 140-154 for storage of that data over at least one bus. The controller 106 can then generate a mapping of each of memories 140-154 and memory storage areas (e.g., first memory storage area or second memory storage area, as shown in FIG. 2) within each memory that stores the input data, and end values of those memory storage areas, as described below by in FIG. 4. The controller 106 can store such mapping in the data memory 158.

The controller 106 can store, in the memory 160, a counter indicating a current processing time step of multiple processing time steps for processing by the RNN. The controller 106 can increment the counter after every processing time step of the RNN.

For each processing time step of the RNN, the controller 106 can perform the following. The controller 106 can access a current value of the counter from the memory 160 to identify the processing time step. The controller 106 can determine, based on the current value of the counter, the one or more memory storage areas within the one or more memories 140-154 that store the input data for the processing time step, as explained in further detail below. The controller 106 can facilitate access of the input data for the processing time step from those one or more memory storage areas to at least one processor coupled to those one or more memory storage areas. The controller 106 can then increment the current value of the counter stored in the memory 130, as noted above as well.

Storage of the counter and the mapping (noted above) on the accelerator 102 is advantageous, as it prevents the need for the accelerator to communicate with the host device to obtain multiple instructions within a processing time step, thereby minimizing computational latency.

The controller 106 can determine the one or more memory storage areas within the memories 140-154 that store the input data for the processing time step as per the following. The controller 106 can retrieve—from a compiled result generated by a compiler (which may also be embedded within the computing device where the accelerator 102 and/or the host device 104 reside) and provided by that compiler to the accelerator 102—a value of a stride associated with the recurrent neural network. The compiled result can be a machine code in a low-level computer language that can be interpreted by the accelerator 102. The controller 106 can determine, based on the current value of the counter and the value of the stride, values of at least two edges of the input data for the processing time step. More specifically, the controller 106 can compute each edge by multiplying the current value of the counter and the value of the stride. The controller 106 can determine, using the mapping stored in the data memory 158 and based on the values of the at least two edges, the one or more memory storage areas that store the input data for the processing time step. For example, if the value of the left edge for the input data for a processing time step is 103 and the value of the right edge for that input data is 147, the controller can use the mapping of FIG. 4 to determine that the input data for this processing time step is stored in the first memory storage area 204 of the memory 144 (which is in the third computing unit 112).

The controller 106 can store the output generated by the recurrent neural network for each processing time step of the plurality of processing time steps in the memory 162. The controller 106 can then transmit the output for all of the processing time steps together, rather than individually transmit the output generated by the RNN for each processing time step. Such transmission of output for all of the processing time steps (rather than multiple outputs corresponding to each processing time step) minimizes communication between the accelerator 102 and the host device 104, thereby advantageously minimizing computational latency and thus maximizing computational efficiency. In an alternate implementation, the controller 106 can transmit the output for a processing time step after multiple processing time steps have completed (e.g., controller 106 can transmit, to the host device 104, outputs of three processing time steps together).

FIG. 2 illustrates a memory 202—which can be any one of memories 140-154—that includes a first memory storage area 204 and a second memory storage area 206. The first memory storage area 204 can be configured to store input data for the RNN. The second memory storage area 206 can be configured to store weights for the RNN. The memory storage areas can also be referred to as registers or memory banks.

The memory storage area 204 can include one or more narrow memories, and the memory storage area 206 can include one or more wide memories. Wide and narrow designations are attributes of a corresponding memory, and generally refer to a width (and in an alternative implementation, refers to an approximate width) of the memory in bits and/or bytes.

Figure 2A:
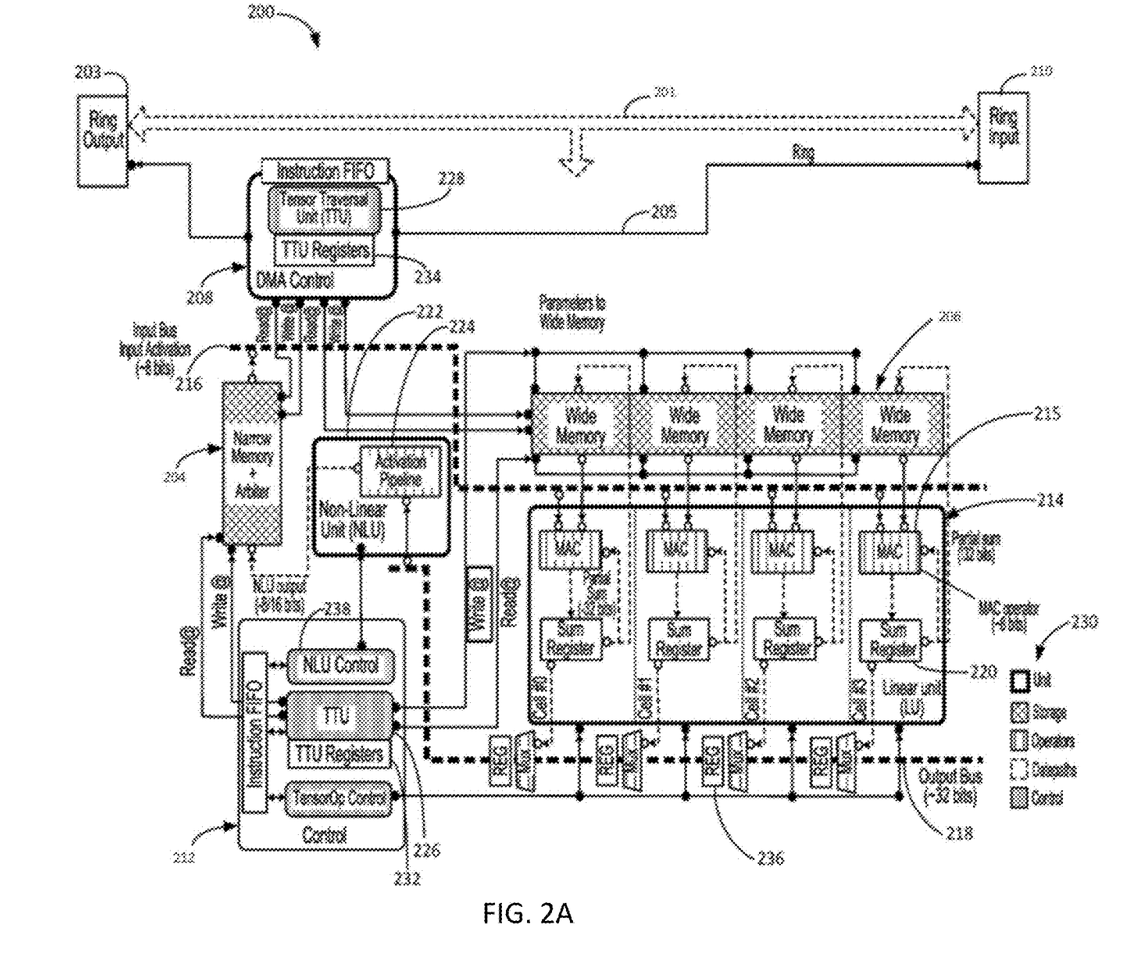
FIG. 2A illustrates a computing unit of the accelerator.

FIG. 2A illustrates an example of a computing unit 200 that performs one or more RNN computations. The computing unit 200 can correspond to any of the computing units 108-122. Each computing unit 200 is a self-contained computational unit configured to execute instructions independently relative other corresponding computing units within computing units 108-122. Each computing unit 200 can execute two types of instructions, a tensor operation (also referred to as TensorOp) instruction and a direct memory access operation (also referred to as DMAOp) instruction. Each instruction type includes compute operations associated with deep loop nests of RNN and thus each instruction type generally executes over multiple time epochs to ensure completion of all loop iterations.

The different instruction types are executed by independent control units within compute tile 200 that synchronize on data through sync flag controls that are managed within compute tile 200. The sync flag controls manage concurrency between executions of different instruction types within compute tile 200. Each compute operation associated with each instruction type is executed in strict order of issuance (i.e., First-In First-Out). With regard to the two instruction types, TensorOP and DMAOp, there are no ordering guarantees between these different instruction types and each type is treated by the computing unit 200 as a separate thread of control.

With regard to data flow constructs, the computing unit 200 generally includes data path 201 and data path 205 that each provide a communications path for data flow into and out of the computing unit 200. The computing units 108-154 can be connected via three distinct data bus structures that can be laid out in a ring configuration—CSR bus, instruction bus, and ring bus. The data path 205 corresponds to instruction bus, while data path 201 generally corresponds to one of CSR bus and ring bus. The data path 201 includes a ring output 203 providing an output path for data leaving computing unit 200 and a ring input 210 providing an input path for data entering computing unit 200.

The computing unit 200 further includes a TensorOp control 212 including a TensorOp tensor traversal unit (TTU) 226 and a DMAOp control 208 including a DMAOp TTU 228. TensorOp control 212 generally manages writes to and reads from TensorOp TTU register 232 and administers traversal operations for execution by TensorOp TTU 226. Likewise, DMAOp control 208 generally manages writes to and reads from DMAOp TTU register 234 and administers traversal operations for execution by DMAOp TTU 228. TTU register 232 includes instruction buffers for storing one or more instructions comprising operations to be performed by TensorOp TTU 226 upon execution of the instructions by TensorOp control 212. Likewise, TTU register 234 includes instruction buffers for storing one or more instructions comprising operations to be performed by TTU 208 upon execution of the instructions by DMAOp control 208. As described further below, TTUs are used by computing unit 200 to traverse array elements of one or more tensors that generally reside in narrow memory 204 and wide memory 206.

In some implementations, certain instructions for execution by compute tile 200 arrive at the tile via data path 205

(i.e., a portion of instruction bus). The computing unit 200 examines the header bitmap to determine the instruction type (TensorOp or DMAOp) and the instruction subtype (read operation or write operation). Instruction(s) received by computing unit 200 are subsequently written to a particular instruction buffer depending on the instruction type. In general, instructions are received and stored (i.e., written to the buffer) prior to execution of the instruction by a component of computing unit 200. The instruction buffers (i.e., TensorOp TTU register 232 and DMAOp TTU register 234) may each include a first-in first-out (FIFO) control scheme that prioritizes consumption (execution) of one or more related instructions.

A tensor is a multi-dimensional geometric object and example multi-dimensional geometric objects include matrices and data arrays. An algorithm, including at least some computing operations of the RNN, may be executed by computing unit 200 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 212 generally administers one or more tensor operations that drive the sequence in which dimensional elements of a particular tensor construct are traversed and accessed to complete computations defined by the deep nested loops.

The computing unit 200 further includes the narrow memory 204 and the wide memory 206, as also discussed by FIG. 2. Narrow and wide designations generally refer to a size in width (bits/bytes) of the memory units of narrow memory 204 and wide memory 206. In some implementations, narrow memory 204 includes memory units each having a size or width of less than 16-bits and wide memory 206 includes memory units each having a size or width or less than 32-bits. Generally, computing unit 200 receives input activations via data path 205 and DMA control 208 executes an operation to write the input activations into narrow memory 204. Likewise, computing unit 200 receives parameters (weights) via data path 201 and DMA control 208 executes an operation to write the parameters into wide memory 206. In some implementations, narrow memory 204 can include a memory arbiter typically used in shared memory systems to decide, for each memory cycle, which control device (e.g., TensorOp control 212 or DMAOp control 208) will be allowed to access that shared memory units of narrow memory 204.

The computing unit 200 further includes an input activation bus 216 and a MAC array 214 including multiple cells that each include a MAC operator 215 and a sum register 220. In general, MAC array 214 executes, using MAC operators 215 and sum registers 220 across multiple cells, tensor computations that include arithmetic operations relating to dot product computations. Input activation bus 216 provides a data path in which input activations are provided, by narrow memory 204, one-by-one for respective access by each MAC operator 215 of MAC array 214. Hence, based on the one-by-one broadcast of an input activation, a single MAC operator 215 of a particular cell will each receive an input activation. Arithmetic operations performed by the MAC operators of the MAC array 214 generally include multiplying an input activation provided by narrow memory 204 with a parameter accessed from wide memory 206 to produce a single output activation value.

During arithmetic operations, partial sums may be accumulated and stored in a corresponding, e.g., sum register 220, or written to wide memory 206 and re-accessed by a particular cell of MAC array 214 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 204 after application of the function.

The computing unit 200 further includes an output activation bus 218, a non-linear unit (NLU) 222 comprising an output activation pipeline 224, an NLU control 238, and a reference map 230 that indicates a core attribute of a component in compute tile 200. Reference map 230 is shown for clarity, but is not included in the compute tile 200. Core attributes include whether a particular component is a unit, a storage device, an operator, a control device or a data path. In general, upon completion of the first portion of the tensor computations, output activations are provided from MAC array 214 to NLU 222 via output activation bus 218. After arrival at NLU 222, data specifying an activation function, received via activation pipeline 224 is applied to the output activations and the output activations are then written to narrow memory 204. In some implementations, output activation bus 218 includes at least one pipelined shift register 236 and completing the second portion of the tensor computations includes using a shift register 236 of activation bus 218 to shift output activations toward narrow memory 204.

With regard to dot product computations of, for example, two multi-dimensional data arrays, for a single computing unit 200, MAC array 214 provides robust single instruction multiple data (SIMD) functionality. SIMD generally means that all parallel units (multiple MAC operators 215) share the same instruction (based on the deep loop nest), but each MAC operator 215 executes the instruction on different data elements. In one basic example, adding the arrays [1,2,3,4] and [5,6,7,8] element-wise to obtain the array [6,8,10,12] in one cycle will typically require four arithmetic units to execute the operation on each element. By using SIMD, the four units can share the same instruction (e.g., "add") and perform computations in parallel. Thus, the accelerator 102 and the computing unit 200 provides enhanced acceleration and parallelism in tensor computations over prior methods.

In one example, a single instruction can be provided by controller 106 to multiple computing units 200 (e.g., computing units 108-122) for consumption by multiple MAC arrays 214. In general, neural network layers can include multiple output neurons and the output neurons can be partitioned such that tensor computations associated with a subset of output neurons can be assigned to a particular tile of tile sets 112, 114. Each tile of tile sets 112, 114 can then perform related tensor computations on different groups of neurons for a given layer. The computing unit 200 can therefore provide at least two forms of parallelism: (1) one form includes partitioning the output activations (corresponding to the subset of output neurons) amongst the multiple computing units 108-122; and (2) another form includes simultaneous computation (with a single instruction) of multiple subsets of output neurons based on the partitioning amongst the computing units 108-122. A compiler (which may also be embedded within the computing device where the accelerator 102 and/or the host device 104 reside) coupled to the accelerator 102 can determine, and indicate to the accelerator 102, the specific target tile for each of the neural network inputs. For example, the compiler generates a run-time code to determine the one or more computing units (i.e. one or more of computing units 108-122) that has the relevant portion of input for each specific processing time step.

Figure 3:
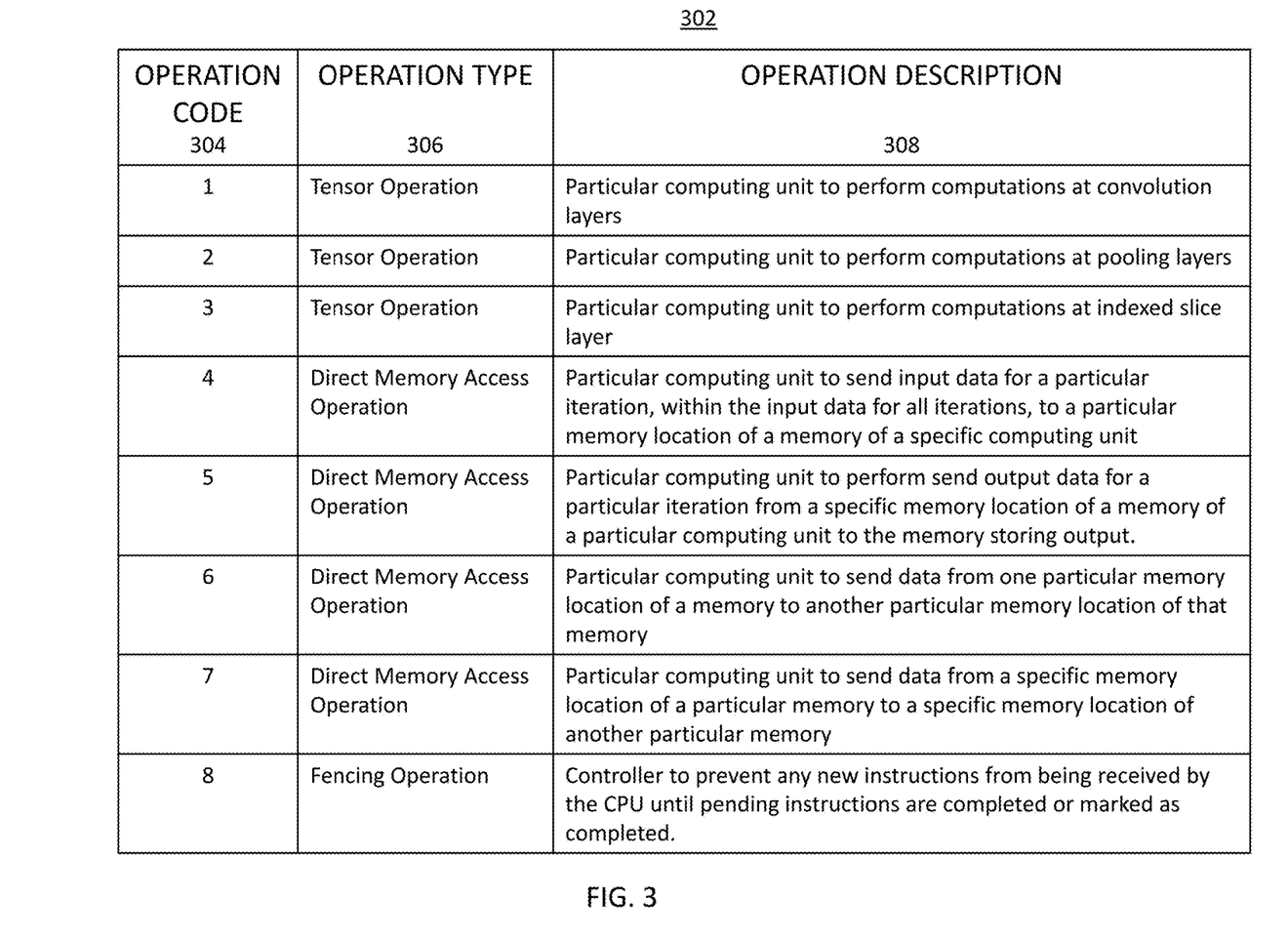
FIG. 3 illustrates a table showing some types of operations that can be specified by (i.e., encoded by) the instruction received by the accelerator from the host device.

FIG. 3 illustrates a table 302 showing some types of operations that can be specified by (i.e., encoded by) the instruction received by the accelerator 102 from the host device 104. The table 302 can be stored in a memory accessible by the accelerator 102 and the host device 104. For all processing time steps corresponding to inputs received sequentially by the RNN, the accelerator 102 can receive a single instruction from the host device 104, rather than receive multiple instructions, from the host device 104, as noted above. The instruction received by the accelerator 102 can include operation codes (also referred to as opcodes) 304 for various operations. The accelerator 102 can use the table 302 to infer the operation specified by the opcode 304. The table 302 indicates an operation type 306 and a description 308 of the operation specific to each opcode 304.

The instruction can have a standardized structure, which can include one or more opcodes 304 to specify one or more operations to be performed by particular computing units to attain a particular compute sequence. The opcode for each operation can be different from other opcodes.

The operation types 306 can include tensor operations, direct memory access operations, and/or fencing operations, as shown, and/or other possible operations that are not shown. The controller 106 can transfer relevant parts of the instructions to electronic components, such as the computing unit, that needs to perform those parts of the instructions. For example, an operation specifying a particular computing unit for performing that operation needs to be performed by that specified particular computing unit.

If data is moved between two memory resources of unequal widths (e.g., a wide memory and a narrow memory), the transfer size of the data must be a multiple of the wider resource. For example, if a direct memory access operation moves data to/from a wide memory, the size of the transfer data must be a multiple of the width of that wide memory. Likewise, for a direct memory access operation that moves data to/from a narrow memory, the size of the transfer of the data must be a multiple of the width of that narrow memory. The accelerator 102 can identify, from the tensor operation, the operation that has to be performed, and can identify, from the DMA operation, how to copy data, including source and destination memory address, size of the transfer of data, and method of synchronizing between the copying of data and the computation technique. The computation can commence as soon as the expected portion of data is in the memory.

Figure 4:
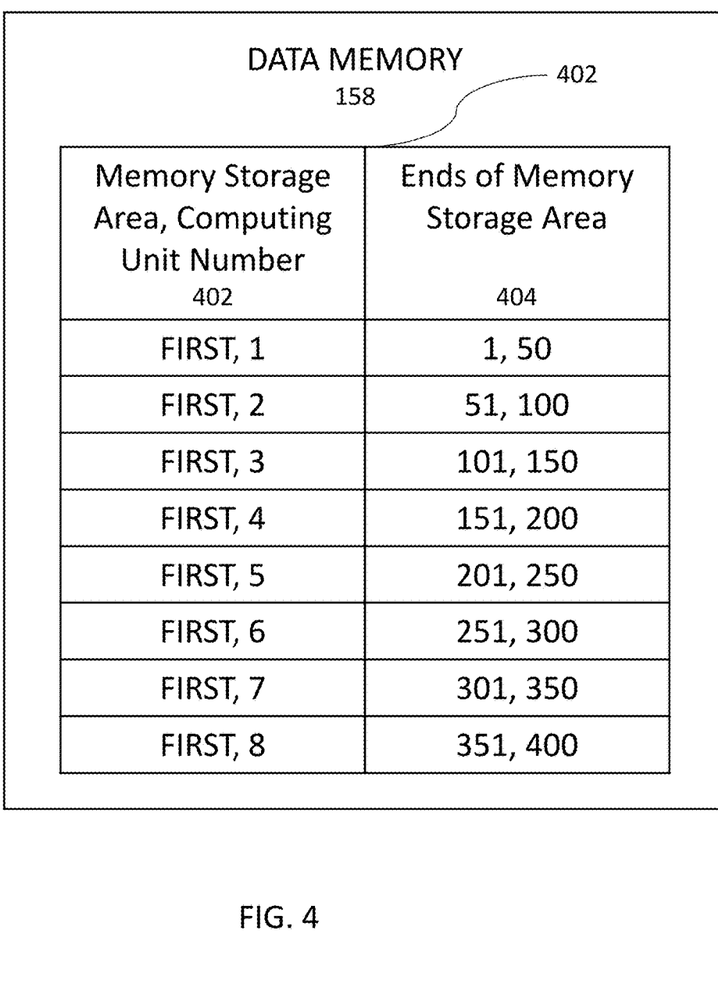
FIG. 4 illustrates a mapping of specific memory storage areas along with a corresponding memory on the accelerator and ends of input data.

FIG. 4 illustrates a mapping 402 of memory storage areas (e.g., first memory storage area 204 or a second memory storage area 206) and a corresponding memory (i.e., one of memories 140-154) 404 and ends 406 of those memory storage areas. In the shown example, it is assumed that each of the memories 140-154 have the same storage capacity, and therefore stores a same amount of data. In alternate implementations, at least some of the memories 140-154 can have different storage capacities, which in turn would cause the values in the right column of FIG. 4 to change. To maximize storage efficiency, the input data is advantageously stored contiguously (rather than, for example, storing input data corresponding to each processing time step in a separate memory).

When the RNN is to process data, the controller 106 can compute the edges of the input data for each processing time step based on the current value of the counter and the value of the stride, as noted above. For example, the controller 106 can compute each edge by multiplying the current value of the counter and the value of the stride. The controller 106 can then use the values of the edges to determine, using the mapping 402, the one or more memories 204 that store the input data for the processing time step. For example, if the value of the left edge for the input data for a processing time step is 103 and the value of the right edge for that input data is 147, the controller can use the mapping of FIG. 4 to determine that the input data for this processing time step is stored in the first memory storage area 204 within the memory 144.

Once the controller identifies which specific memory portion has the input data needed, the controller extracts the input data from that specific memory storage area. The controller identifies, from instructions generated and provided by the compiler, specific memory address from where to get the input data within that specific memory storage area. The compiler generates, during compile time, such instructions to identify the source location, which includes the tile and the memory address of that tile having the appropriate input data. Once the source memory is identified, the generated instruction will write the information to registers on the accelerator. Since the registers are part of the instructions, the accelerator 102 executes the instructions generated by compiler to get the source memory address and data information such as the size of the transfer of data.

Figure 5:
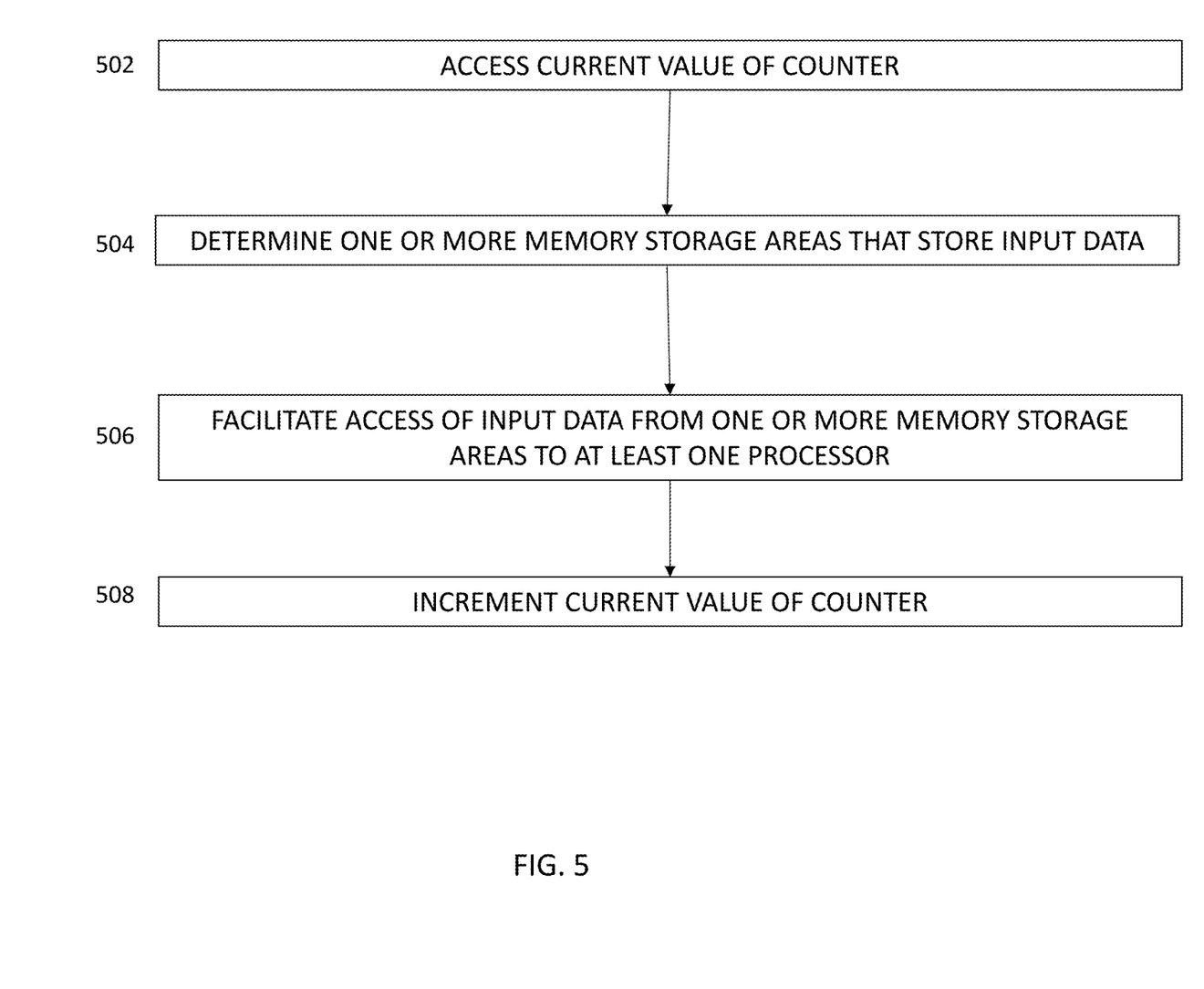
FIG. 5 illustrates a method performed by the accelerator to access a counter to determine one or more memory storage areas that store input data for a current processing step of the RNN.

FIG. 5 illustrates a method performed by the accelerator 102 to access a counter to determine one or more memory storage areas that store input data for a current processing time step of the RNN. The controller 106 can store, in one or more memory storage areas within the memories 140-154, input data for each processing time step of a plurality of processing time steps for processing by the RNN.

The controller 106 can then perform the following for each processing time step. The controller 106 can access, at 502, a current value of a counter stored in the memory 160. The current value of the counter can identify the processing time step. The controller 106 can determine, at 504 and based on the current value of the counter, one or more specific memory storage areas that store the input data for the processing time step. The controller 106 can facilitate, at 506, access of the input data for the processing time step from the one or more specific memory storage areas to at least one of the processors 124-138 that are coupled to the one or more memory storage areas. For example, the controller 106 can send, to the source tile (i.e., the tile that has the data), an instruction that can cause the source tile to send the data to the target tile (i.e., the tile that needs to perform the initial computation for that time step). The controller can increment, at 508, the current value of the counter stored in the memory 160.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other type of processor.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
storing, by a hardware accelerator and in a plurality of memory storage areas in one or more memories on the hardware accelerator, input data for each processing time step of a plurality of processing time steps for processing sequential inputs to a machine learning model;

for each processing time step of the plurality of processing time steps:
- accessing, by the hardware accelerator, a current value of a counter stored in a register within the hardware accelerator, the current value of the counter identifying the processing time step;
- determining, by the hardware accelerator and based on the current value of the processing time step counter, one or more memory storage areas that store the input data for the processing time step, including:
  - retrieving, by the hardware accelerator, a value of a stride associated with the machine learning model;
  - computing, by the hardware accelerator and based on the current value of the counter and the value of the stride, values of at least two edges of the input data for the processing time step; and
  - determining, by the hardware accelerator and based on the values of the at least two edges, the one or more memory storage areas that store the input data for the processing time step;
- facilitating, by the hardware accelerator, access of the input data for the processing time step from the one or more memory storage areas to at least one processor coupled to the one or more memory storage areas; and
- incrementing, by the hardware accelerator, the current value of the counter stored in the register.

2. The method of claim 1, further comprising:
generating, by the hardware accelerator, a mapping of each memory storage area and ends of the one or more memory storage areas; and
storing, by the hardware accelerator, the mapping in a register within the hardware accelerator,
wherein the ends of the one or more memory storage areas encompass the at least two edges.

3. The method of claim 2, wherein the computing of the values of the edges involve:
multiplying, by the hardware accelerator, the current value of the counter and the value of the stride.

4. The method of claim 1, further comprising:
receiving, by the hardware accelerator and from a central processing unit, a single instruction for each processing time step of the plurality of processing time steps,
wherein the hardware accelerator performs at least the determining of the one or more storage areas and the facilitating of the access of the input data for the processing time step to the at least one processor in response to the receiving of the single instruction.

5. The method of claim 4, further comprising:
storing, by the hardware accelerator, the single instruction in another memory within the hardware accelerator.

6. The method of claim 5, wherein the hardware accelerator and the central processing unit are embedded in a mobile phone.

7. The method of claim 1, further comprising:
receiving, by the hardware accelerator and prior to the storing, the input data for each processing time step of the plurality of processing time steps from a central processing unit.

8. The method of claim 1, wherein the storing of the input data for each processing time step of the plurality of processing time steps comprises:
transmitting, by a controller of the hardware accelerator, the input data for each processing time step of the plurality of processing time steps to the plurality of memory storage areas.

9. The method of claim 8, wherein the controller transmits the input data for each processing time step of the plurality of processing time steps to the plurality of memory storage areas over at least one bus.

10. The method of claim 1, wherein the at least one processor and the one or more memory storage areas are present within a single computing unit of a plurality of computing units.

11. The method of claim 1, wherein the input data is separate and different for each processing time step of the plurality of processing time steps.

12. The method of claim 1, further comprising:
storing, by the hardware accelerator, the output generated by the machine learning model for each processing time step of the plurality of processing time steps in another memory within the hardware accelerator; and
transmitting, by the hardware accelerator, the output for each processing time step of the plurality of processing time steps collectively after the plurality of processing time steps.

13. A non-transitory computer program product storing instructions that, when executed by at least one programmable processor, cause the at least one programmable processor to perform operations comprising:
storing, by a hardware accelerator and in a plurality of memory storage areas in one or more memories, input data for each processing time step of a plurality of processing time steps for processing sequential inputs to a machine learning model;
for each processing time step of the plurality of processing time steps:
- accessing a current value of a counter stored in a register, the current value of the counter identifying the processing time step;
- determining, based on the current value of the processing time step counter, one or more memory storage areas that store the input data for the processing time step, including:
  - retrieving, by the hardware accelerator, a value of a stride associated with the machine learning model;
  - computing, by the hardware accelerator and based on the current value of the counter and the value of the stride, values of at least two edges of the input data for the processing time step; and
  - determining, by the hardware accelerator and based on the values of the at least two edges, the one or more memory storage areas that store the input data for the processing time step;
- facilitating access of the input data for the processing time step from the one or more memory storage areas to at least one processor coupled to the one or more memory storage areas; and
- incrementing the current value of the counter stored in the register.

14. The non-transitory computer program product of claim 13, wherein the operations further comprise:
generating a mapping of each memory storage area and ends of the one or more memory storage areas; and
storing the mapping in a register,
wherein the ends of the one or more memory storage areas encompass the at least two edges.

15. The non-transitory computer program product of claim 14, wherein the computing of the values of the edges involve:
multiplying the current value of the counter and the value of the stride.

16. The non-transitory computer program product of claim 13, wherein the operations further comprise:
receiving, from a central processing unit, a single instruction for each processing time step of the plurality of processing time steps, wherein the non-transitory computer program performs at least the determining of the one or more storage areas and the facilitating of the access of the input data for the processing time step to the at least one processor in response to the receiving of the single instruction; and
storing the single instruction in another memory.

17. The non-transitory computer program of claim 13, wherein the operations further comprise:
receiving, prior to the storing, the input data for each processing time step of the plurality of processing time steps from a central processing unit,
wherein the storing of the input data for each processing time step of the plurality of processing time steps comprises transmitting the input data for each processing time step of the plurality of processing time steps to the plurality of memory storage areas.

18. The non-transitory computer program of claim 13, wherein the operations further comprise:
storing the output generated by the machine learning model for each processing time step of the plurality of processing time steps in another memory; and
transmitting the output for each processing time step of the plurality of processing time steps collectively after the plurality of processing time steps.

19. The non-transitory computer program of claim 16, wherein the hardware accelerator and the central processing unit are embedded in a mobile phone.

20. The non-transitory computer program of claim 17, wherein a controller of the hardware accelerator transmits the input data for each processing time step of the plurality of processing time steps to the plurality of memory storage areas over at least one bus.

\* \* \* \* \*